(12) United States Patent
Lv et al.

(10) Patent No.: US 9,704,069 B2
(45) Date of Patent: Jul. 11, 2017

(54) IMAGE PROCESSING APPARATUS AND IMAGE PROCESSING METHOD

(71) Applicant: CANON KABUSHIKI KAISHA, Tokyo (JP)

(72) Inventors: You Lv, Beijing (CN); Yong Jiang, Beijing (CN); Bo Wu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 14/642,321

(22) Filed: Mar. 9, 2015

(65) Prior Publication Data
US 2015/0254529 A1 Sep. 10, 2015

(30) Foreign Application Priority Data
Mar. 10, 2014 (CN) .......................... 2014 1 0084612

(51) Int. Cl.
*G06K 9/62* (2006.01)
*G06K 9/72* (2006.01)
*G06K 9/00* (2006.01)

(52) U.S. Cl.
CPC .......... *G06K 9/72* (2013.01); *G06K 9/00671* (2013.01)

(58) Field of Classification Search
CPC ............... G06K 9/6278; G06K 9/0014; G06K 9/00456; G06T 7/0012
(Continued)

(56) References Cited

U.S. PATENT DOCUMENTS 6,983,068 B2 * 1/2006 Prabhakar .......... G06K 9/00456
382/162
7,466,848 B2 * 12/2008 Metaxas ................ A61B 5/055
382/128
(Continued)

FOREIGN PATENT DOCUMENTS

CN 101814149 A 8/2010
CN 103455823 A 12/2013

OTHER PUBLICATIONS

Socher et al., "Parsing Natural Scenes and Natural Language with Recursive Neural Networks.", Proceedings of the 28th International Conference on Machine Learning, Bellevue, WA, USA, (2011) pp. 1-8.

*Primary Examiner* — Yosef Kassa
(74) *Attorney, Agent, or Firm* — Canon U.S.A., Inc. IP Division (57) ABSTRACT

The present invention discloses an image processing evaluating apparatus and image processing method. The processing apparatus comprising: a confidence generation means for generating a classification confidence for each region in the image, the classification confidence represents the probability of an region belonging to a predefined class; and a classification means for classifying the regions in the image, which are obvious to be classified by their classification confidences, to respective classes based on the calculated confidences. The image processing apparatus further comprising: a fuzzy region extraction means for extracting one or more regions, which are not obvious to be classified by their classification confidences, as fuzzy regions; and a confidence update means for updating the classification confidence for each fuzzy region based on the classification confidences of adjacent regions thereof, wherein the classification means further classifies the fuzzy regions to respective classes based on the updated classification confidences.

18 Claims, 8 Drawing Sheets

(58) Field of Classification Search
USPC ........ 382/159, 171, 190, 224, 282; 358/537, 358/538, 452, 453
See application file for complete search history.

(56) References Cited

U.S. PATENT DOCUMENTS

| | | | | |
|---|---|---|---|---|
| 7,650,319 | B2 * | 1/2010 | Hoffberg | ............ G05B 19/0426 706/45 |
| 7,987,003 | B2 * | 7/2011 | Hoffberg | ................ G05B 15/02 370/200 |
| 8,032,477 | B1 * | 10/2011 | Hoffberg | .................. G06N 7/06 706/52 |
| 8,352,094 | B2 * | 1/2013 | Johnson | .................... H02J 3/14 700/291 |
| 8,352,400 | B2 * | 1/2013 | Hoffberg | .................. G06N 7/06 706/10 |
| 8,402,490 | B2 * | 3/2013 | Hoffberg-Borghesani | ........................ G05B 19/0426 725/46 |
| 8,488,863 | B2 * | 7/2013 | Boucheron | .......... G06K 9/0014 382/131 |
| 8,600,108 | B2 * | 12/2013 | Tang | ..................... G06T 7/2033 382/103 |

* cited by examiner

IMAGE PROCESSING APPARATUS AND IMAGE PROCESSING METHOD

RELATED APPLICATIONS

This application claims the benefit of Chinese Patent Application No. 201410084612.3 filed Mar. 10, 2014, which is hereby incorporated by reference herein in its entirety.

BACKGROUND OF THE INVENTION

Field of the Invention

The invention relates, in general, to the field of image processing, computer vision and pattern recognition, particularly to the field of multi-class segmentation, and more particularly to an image processing apparatus and method for classifying each region in an image.

Description of the Related Art

Figure 1:
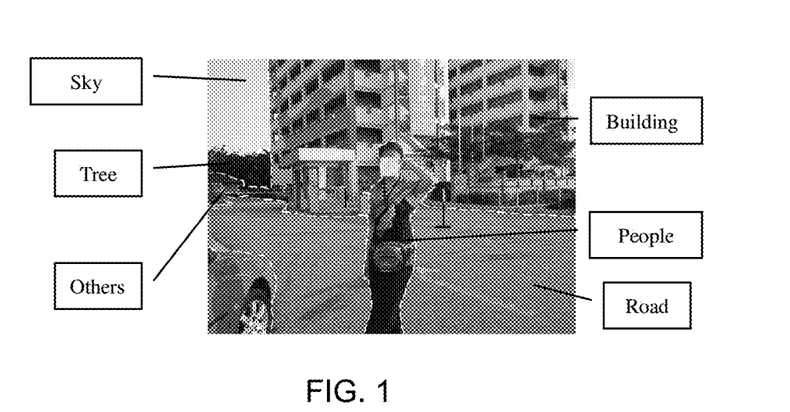
FIG. 1 is a schematic view of multi-class segmentation.

Multi-class segmentation is a method to segment an image to different regions. Each region of the image is classified to a predefined class, such as Sky, Green, Body and Others. The method is helpful to parse the scenes of image. FIG. 1 is a schematic view of multi-class segmentation. As shown in FIG. 1, each segmented region belongs to a predefined class.

Figure 2:
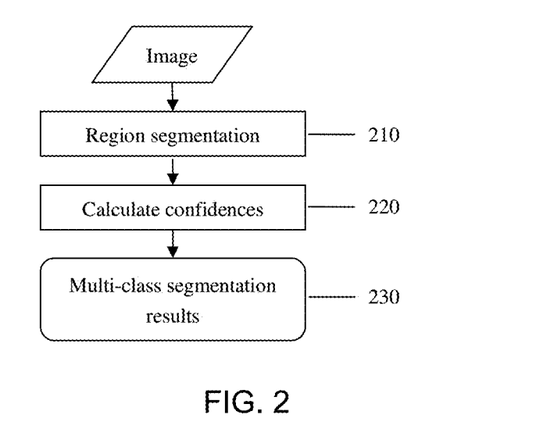
FIG. 2 schematically shows a flowchart of RNN segment method.

Richard Socher (reference can be made to Richard Socher, Cliff Chiung-Yu Lin, Andrew Y. Ng. Parsing Natural Scenes and Natural Language with Recursive Neural Networks. Proceeding of the 28th International Conference on Machine Learning, Bellevue, Wash., USA, 2011) proposed a multi-class segmentation method named Recursive Neural Network (RNN). FIG. 2 schematically shows a flowchart of the RNN segment method.

As shown in FIG. 2, firstly, the method segments the image to regions at step 210. Then, at step 220, it calculates the classification confidence of every class for each region based on the extracted features and trained model. The classification confidence represents the probability of a region belonging to a predefined class and also called as score. Finally, at step 230, the region is classified to the class with the highest score.

Because of the scores are calculated from the features and trained model, if the highest score of a region is not enough higher than the second highest score of the region, it means that the feature of one class is not obvious to others. Then, it may be difficult to distinguish one class from the other when the scores of two classes are close. As described above, this method chooses the class with the highest confidence score as the classification result and if the highest score of one class for a region is not obvious to the others, the classification result will more probably to be wrong. For example, the illustration of the RNN segmentation is shown in FIG. 3.

Figure 3:
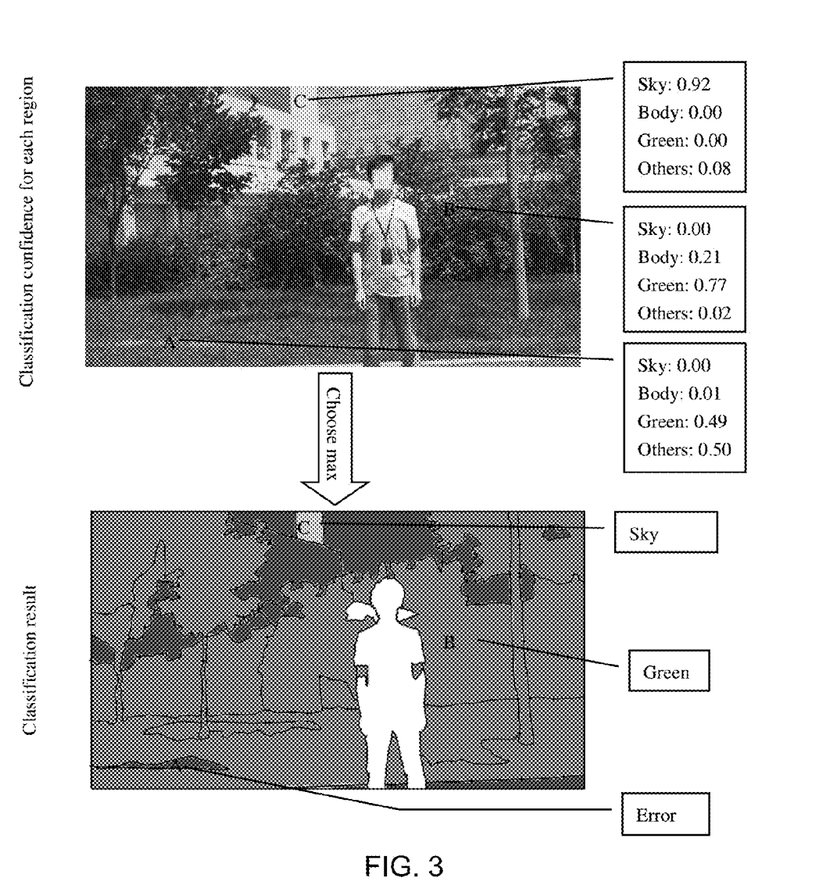
FIG. 3 is an illustration of the RNN segmentation.

As can be seen from the upper picture of FIG. 3, for the region B, the score of Green is far higher than those of the other classes. Then, the region B is classified to Green without doubt. Similarly, the region C is classified to Sky. Those regions B and C are the obvious regions for a class.

However, as can be seen, for the region A, the score of Others is only a little higher than that of Green. According to the RNN segmentation, the region A is classified to Others as shown on the lower picture of FIG. 3. However, from the original image (i.e., the upper picture of FIG. 3), it can be seen that the region A should belong to classification Green. In this regard, the unobvious score leads to a wrong classification result, which is also not self-adaptive inside an image.

In view of above, it is desired to provide a new image processing apparatus and image processing method, which are capable of precisely classifying all the regions, particularly, the non-obvious regions, to predetermined classes.

SUMMARY OF THE INVENTION

The present invention is proposed in view of at least one of the above problems.

The present invention pays much attention to the non-obvious regions which are fuzzy in classification and also called fuzzy regions. Generally, the misclassification ratio of fuzzy region is greater than other regions. The present invention aims to find out the fuzzy regions and loop to re-classify them with neighborhood information, in order to correct the fuzzy results as much as they can.

The present invention is also based on regions. Experiments have proved that the present invention can improve the precision of classification without any additional external detection results. The improvement is not only for some special classes, but is working for each class of the image, equally. Also, the present invention can self-adapt the environment condition inside the image.

One object of the present invention is to provide a new image processing apparatus and a new image processing method, which can classify the fuzzy regions precisely.

According to a first aspect of the present invention, there is provided an image processing method for classifying each region in an image, comprising: a confidence generation step for generating a classification confidence for each region in the image, the classification confidence represents the probability of a region belonging to a predefined class; and a classification step for classifying the regions in the image, which are obvious to be classified by their classification confidences, to respective classes based on the calculated confidences. The method further comprising: a fuzzy region extraction step for extracting one or more regions, which are not obvious to be classified by their classification confidences, as fuzzy regions; and a confidence update step for updating the classification confidence for each fuzzy region based on the classification confidences of adjacent regions thereof. The classification step further classifies the fuzzy regions to respective classes based on the updated classification confidences.

According to a second aspect of the present invention, there is provided use of the image processing method as described above in the field of image composition or image search.

According to a third aspect of the present invention, there is provided an image processing apparatus for classifying each region in an image, comprising: a confidence generation means for generating a classification confidence for each region in the image, the classification confidence represents the probability of an region belonging to a predefined class; and a classification means for classifying the regions in the image, which are obvious to be classified by their classification confidences, to respective classes based on the calculated confidences. The image processing apparatus further comprising: a fuzzy region extraction means for extracting one or more regions, which are not obvious to be classified by their classification confidences, as fuzzy regions; and a confidence update means for updating the classification confidence for each fuzzy region based on the classification confidences of adjacent regions thereof. The classification means further classifies the fuzzy regions to respective classes based on the updated classification confidences.

According to a fourth aspect of the present invention, there is provided use of the image processing apparatus as described above in the field of image composition or image search.

By virtue of the above features, the fuzzy regions are extracted and the confidences are updated to improve the precision of classification result of the fuzzy regions without influence on the classification result of the obvious regions, and a self-adaptive classification result for the image can be achieved.

Further objects, features and advantages of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain the principles of the present invention.

DESCRIPTION OF THE EMBODIMENTS

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Figure 4:
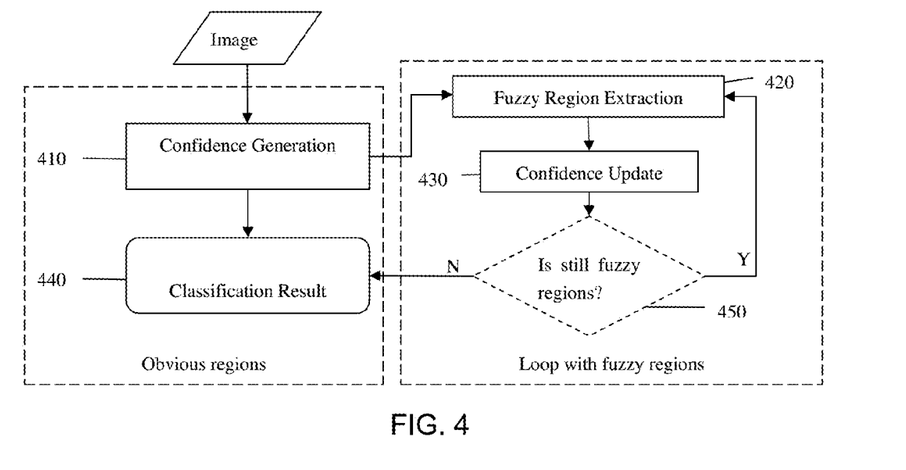
FIG. 4 schematically shows a general flowchart of the image processing method according to an embodiment of the present invention.

FIG. 4 schematically shows a general flowchart of the image processing method for classifying each region in an image according to an embodiment of the present invention, particularly, based on fuzzy regions.

As shown in FIG. 4, the method may comprise a confidence generation step 410, a fuzzy region extraction step 420, a confidence update step 430 and a classification step 440.

At the confidence generation step 410, a classification confidence for each region in the image is generated.

Figure 5:
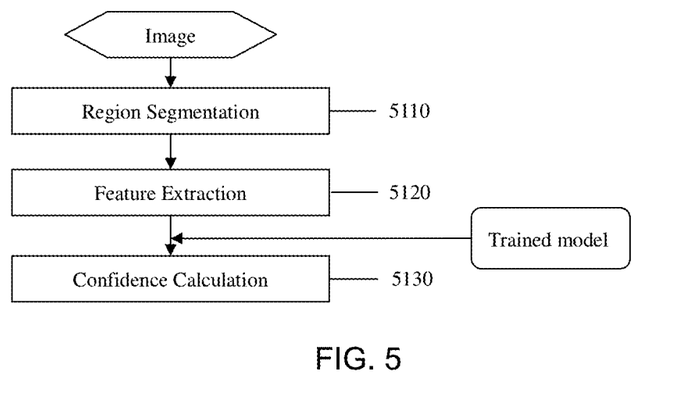
FIG. 5 is a schematic flowchart showing an exemplary process for the confidence generation step according to an embodiment of the present invention.

At this step, the confidence of all image pixels for each predefined class is calculated. There are many ways to get the confidence. FIG. 5 is a schematic flowchart showing an exemplary process for the confidence generation step 410 according to an embodiment of the present invention.

As shown in FIG. 5, the process may comprise a region segmentation step 5110 for segmenting the image into a plurality of non-overlapped regions, a feature extraction step 5120 for extracting the features for each region, and a confidence calculating step 5130 for calculating the classification confidence for each region based on a trained model for each predetermined class.

The image may refer to an input original image or the processed image. The segmentation method in the region segmentation step 5110 is not particularly limited, as long as the image is segmented into a plurality of non-overlapped regions and the plurality of non-overlapped regions as a whole constitutes the image. For example, an over-segmentation method can be employed to segment the image into a plurality of regions. The employed over-segmentation method can be a Felzenszwalb method (reference can be made to Pedro F. Felzenszwalb, Daniel P. Huttenlocher, 'Efficient Graph-based Image Segmentation', International Journal of Computer Vision, Vol. 59, No. 2, September 2004), an SLIC method (reference can be made to Radhakrishna Achanta, Appu Shaji, Kevin Smith et al., 'SLIC Superpixels', EPFL Technical Report, No. 149300, June 2010) etc.

Different over-segmentation methods result in different segmented regions. However, this will not make radical influence on the classification result. Alternatively, any other suitable methods can also be employed to segment the image into a plurality of regions.

Also, the feature extraction processing in step 5120 is not particularly limited and there is not any limitation to which features must be included. Many features can be used in this step, such as SVL (STAIR Vision Libraty) (reference can be made to Stephen Gould, Olga Russakovsky, The STAIR Vision Library. Http://ai.stanford.edu/~sgould/svl, 2009), LBP (Local Binary Patterns) (reference can be made to Timo Ojala, Matti Pietikanen, Multiresolution Gray-Scale and Rotation Invariant Texture Classification with Local Binary Patterns. IEEE transactions on pattern analysis and machine intelligence, vol. 24, No. 7, July 2002), etc. Different features may cause something different in the subsequent process. However, this will not make radical influence on the classification result. Alternatively, any other suitable methods can also be employed to extract the features.

The calculated confidence for each class in the step 5130 depends on the similarity between the extracted features and the trained model. The calculation unit could be the region from the step 5110. In this embodiment, the class types are predetermined as Sky, Green, Body and Others, for example. The example of confidence scores of each region for different classes can be as shown in FIG. 3.

Now, referring back to FIG. 4, at the fuzzy region extraction step 420, one or more regions, which are not obvious to be classified by their classification confidences, are extracted as fuzzy regions.

In this step, the fuzzy regions of the image will be found. There are many ways to get the fuzzy regions. There are also proposed two approaches to find fuzzy regions: one is based on confidence threshold, the other is based on Graph-cut (reference can be made to Boykov, Y., Jolly, M. Interactive Graph Cuts for Optimal Boundary and Region Segmentation of Objects in N-D images. In Proc. IEEE Int. Conf. on Computer Vision, 2001).

Figure 7:
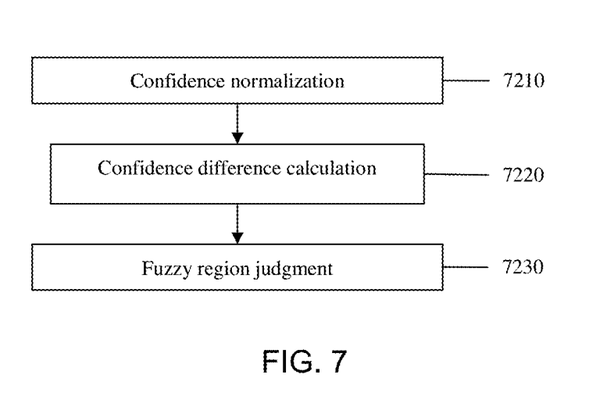
FIG. 7 is a schematic flowchart showing an exemplary process for the fuzzy region extraction step according to an embodiment of the present invention.

FIG. 7 is a schematic flowchart showing an exemplary process for the fuzzy region extraction step 420 according to an embodiment of the present invention.

For example, as shown in FIG. 7, the threshold method for fuzzy region extraction may comprise: a confidence normalization step 7210 for normalizing the classification confidences for each region in the image; a confidence difference calculation step 7220 for calculating the difference between the maximum classification confidence and the second maximum classification confidence for each region; and a fuzzy region judgment step 7230 for judging an region, for which the calculated confidence difference is lower than a predefined threshold, as a fuzzy region.

That is to say, the threshold method checks each region in the image whether its maximum class score (or confidence) is enough larger than the second maximum class score. If the difference value is under a threshold, the region will be marked as fuzzy region. The threshold method can be described as Function (1). In experience, the threshold can be set as 0.2. However, the threshold can be set as other values according to actual needs.

$$\text{Fuzzy}(r) = \begin{cases} 1 & Score_{Max}(r) - Socre_{2nd\_Max}(r) < \text{threshold} \\ 0 & \text{else} \end{cases} \quad r \in \text{fuzzy region} \quad (1)$$

Figure 8:
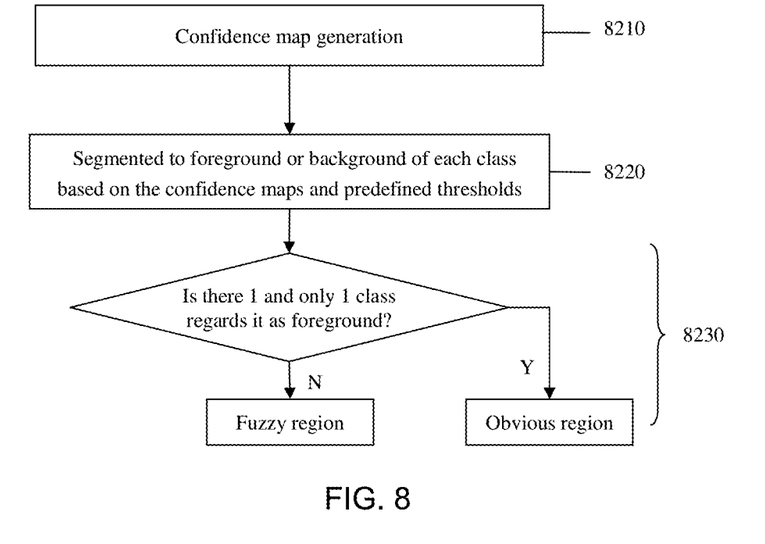
FIG. 8 is a schematic flowchart showing an exemplary process for the fuzzy region extraction step according to another embodiment of the present invention.

FIG. 8 is a schematic flowchart showing an exemplary process for the fuzzy region extraction step according to another embodiment of the present invention.

As shown in FIG. 8, the fuzzy region extraction step may comprise: a confidence map generation step 8210 for creating a confidence map for each class based on the classification confidence of each region; a region segmentation step 8220 for segmenting each confidence map into foreground and background regions of each class based on the confidence maps and predefined thresholds; and a fuzzy region judgment step 8230 for judging an region, which is not segmented into the foreground region of one and only one class, as fuzzy region.

In this method, the regions are labelled to salient foreground, salient background or unknown region of each class with a larger threshold, such as 0.3, and the confidence map is obtained. Then, each confidence map is segmented into foreground and background regions of each class based on the confidence maps and predefined thresholds. Particularly, Graph-cut algorithm can be done for each class. This will take the obvious regions of a class as foreground for Graph-cut, and take the obvious regions of the rest classes as background. Thus, the Graph-cut algorithm will calculate whether the basic unobvious regions belong to the foreground of each class. Then, the segmentation results of all classes of each region will be accumulated. If there is one and only one class regard a region as foreground, the region will be regarded as obvious. Otherwise, the region can be considered as fuzzy region.

Figure 9:
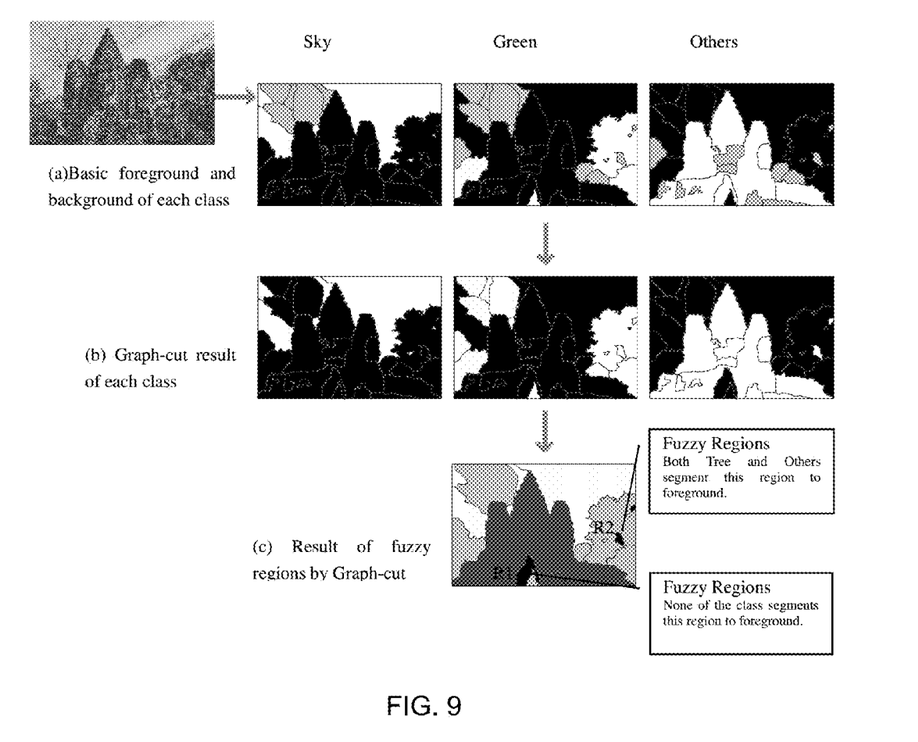
FIG. 9 is an illustration of fuzzy region extraction with Graph-cut method.

For example, in the step 8210, the method will get the basic obvious image regions for each class, in which the white regions in the three images of FIG. 9(*a*) are labelled to the basic foreground of each class, the black regions are labelled to background, and the grey regions are labelled to unknown.

In the step 8220, the method may segment the fuzzy regions to foreground and background of each class based on, for example, Graph-cut. The three images in FIG. 9(*b*) show the result of Graph-cut for each class.

In the step 8230, the method will get fuzzy regions with each class Graph-cut result. The three images in FIG. 9(*c*) show the result of fuzzy region judgment, in which none of the class segments the region R1 to foreground, and both Tree and Others segment the region R2 to foreground, and thus the regions R1 and R2 are judged as fuzzy regions.

As shown in flowchart FIG. 4, the next step to the fuzzy extraction step is the confidence update step 430, in which the classification confidence for each fuzzy region based on the classification confidences of adjacent regions thereof is updated.

There are many ways to update the confidence. For example, FIG. 10 shows a schematic flowchart for the confidence update based on weighed accumulating.

Figure 10:
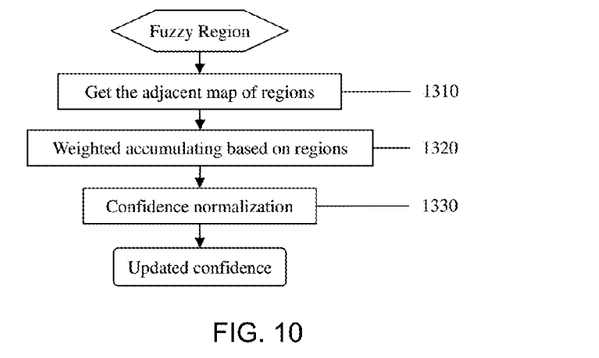
FIG. 10 schematically shows a flowchart of the confidence update step according to an embodiment of the present invention.

As shown in FIG. 10, the confidence update step may comprise: an adjacent map establishment step 1310 for getting the neighbourhood of each fuzzy region; a weighted confidence calculating step 1320 for accumulating the classification confidences of each fuzzy region and the adjacent regions thereof in weighting; and a confidence normalization step 1330 for normalizing the accumulated classification confidence of each fuzzy region as the updated classification confidence.

In the step 1310, the method gets the adjacent map of fuzzy regions. It can scan the image to find the regions around the fuzzy region.

In the step 1320, the method accumulates the confidence of each class in weight for a fuzzy region and all its neighbor regions. Many kinds of neighbor weight and neighbor vector can be selected for the weighted accumulating.

Figure 11:
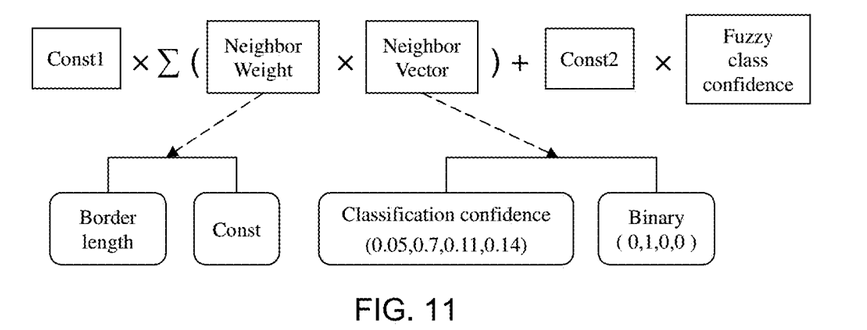
FIG. 11 schematically shows the construction of weighted accumulating according to an embodiment of the present invention.

For example, FIG. 11 schematically shows the construction of weighted accumulating according to an embodiment of the present invention. According to the construction of weighted accumulating in FIG. 11, the neighbor weight can be set as a constant, the border length, or the like, and the neighbor vector can be set as the classification confidence, binary, or the like.

Specifically, if a fuzzy region has N neighbor regions, Const1 can be set as 1/N. And if Const2 is set as 0, the confidence update will not use the information of fuzzy region itself. Nevertheless, the neighbor weight and neighbor vector are not limited to the example in FIG. 11, and they can be set as other values according to actual needs.

Figure 12:
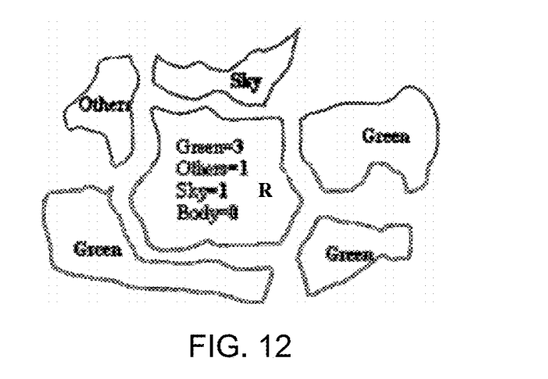
FIG. 12 schematically shows an example of weighted accumulating according to an embodiment of the present invention.

FIG. 12 schematically shows an example of weighted accumulating according to an embodiment of the present invention. In the example of FIG. 12, the fuzzy region R has 5 neighbor regions, Const1 is set as ⅕, Const2 is set as 0, neighbor weight is set as 1 and binary is set as neighbor vector. As can be seen, the neighbor regions are 5 obvious regions, of which 3 regions are Green, 1 region is Sky and 1 region is Others. According to the weighted accumulating method, the confidence for the fuzzy region R (3, 1, 1, 0) is obtained after normalization.

Figure 13:
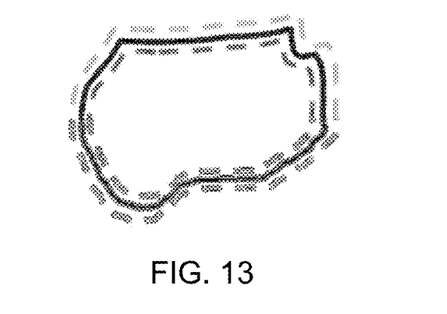
FIG. 13 schematically shows another example of weighted accumulating according to an embodiment of the present invention.

FIG. 13 schematically shows another example of weighted accumulating according to an embodiment of the present invention, in which border length of the neighbor region is chosen as neighbor weight and class confidence of each neighbor as neighbor vector. Const1 is set as 1, Const2 is set as the boundary length of the fuzzy region. As shown in FIG. 13, the accumulating can be considered as a boundary averaging. It accumulates the confidence of each inside and outside pixels along with the boundary of the fuzzy region.

According to both the above two kinds of updating methods, the classification results of fuzzy regions are more or less depended on the neighborhood obvious regions. Even though the fuzzy region is not similar to most of the regions of a class, it can also be classified to the class if it is very similar to the obvious regions of the class in current image. Therefore, this kind of updating can self-adapt the surroundings.

Referring back to FIG. 10, in the step 1330, the accumulated confidences are normalized in order to make the confidence of fuzzy regions conform to the other obvious regions. All confidences of the fuzzy regions can be updated independently.

Now referring back to FIG. 4, based on the updated classification confidences, the fuzzy regions are classified to respective classes at the classification step 440.

As can also be seen from FIG. 4, there may comprise an additional step 450 for determining whether it is necessary to repeat the fuzzy region extraction step 420 and the confidence update step 430 so as to improve the classification result as much as possible. For example, if there are still some fuzzy regions according to the fuzzy region extraction step 420, the confidence update step 430 will update the confidence again. Also, a criterion can be set to limit the looping, for example, the repeated times, in order to protect it from over loop or endless loop.

The step 450 is not the necessary step for the method. Rather, this step is used to further improve the classification result. The method without this repeating step can also improve the precision of the classification results for fuzzy regions.

According the embodiment of the present invention, firstly, the method segments an image to different regions and calculates confidence score of each class for each region. Then it extracts the fuzzy regions. Next, it calculates the neighborhood information of the fuzzy regions in order to update the scores of all classes of fuzzy regions. Finally, if there are still some regions matching the criterion of fuzzy region, the method will loop to update the confidence scores. If not, the method will output the updated classification result of each region.

Figure 6:
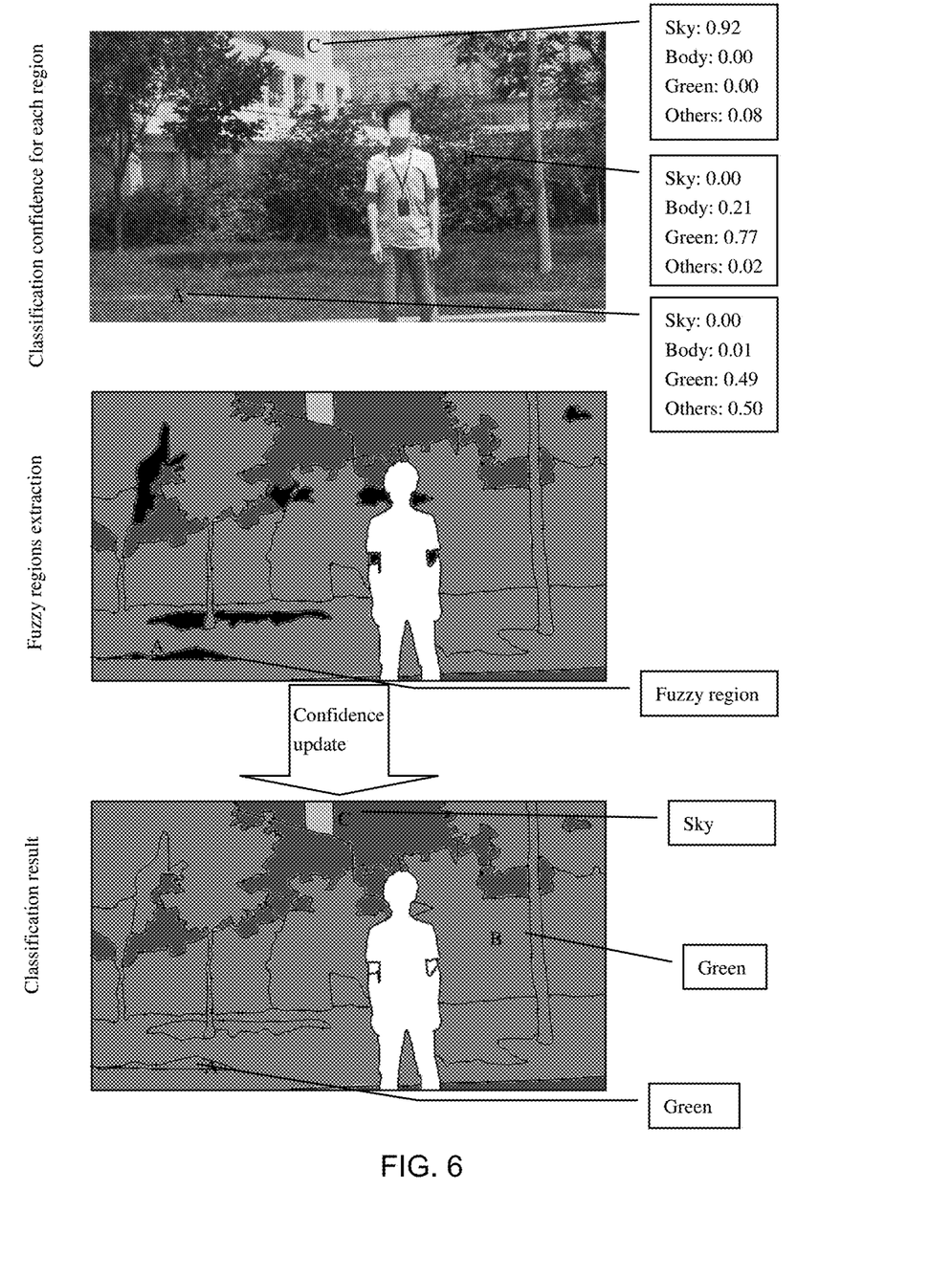
FIG. 6 is an illustration of the classification based on fuzzy regions according to an embodiment of the present invention.

As is known, prior art pays no attention to the fuzzy regions while the present invention pays much attention to the fuzzy regions. The present invention provides additional steps of the fuzzy region extraction and confidence update to overcome the weak points of prior art on fuzzy regions. The comparison in performances between prior art and our invention can be made between FIG. 3 and FIG. 6. It can be seen that the result of the present invention is much better than prior art. It is noted that the looping section of the present invention only effects on the fuzzy regions. The obvious regions will not be modified in looping.

A series of evaluation of the present invention are done to prove the advantageous effect of the present invention. Different thresholds lead to different ratio of fuzzy regions. The dataset is the CIB-March evaluation dataset, which contains 162 images. In this evaluation, the threshold method is used in the fuzzy region extraction step, and the boundary accumulator method is use in the confidence update step.

Because the present invention does not influence the results of obvious regions, the evaluation result only shows the difference of fuzzy regions.

Table 1 shows the accuracy (%) comparison of fuzzy regions on different thresholds. As shown in Table 1, column Threshold is the evaluation threshold in the step of fuzzy region extraction; column Fuzzy Ratio is the area ratio which fuzzy regions occupied in all evaluation dataset; column Fuzzy Accuracy is the segmentation accuracy on the extracted fuzzy regions; column Origin Accuracy is the comparison accuracy of the prior art method on the non-obvious regions (fuzzy regions).

As can be seen from Table 1, the fuzzy accuracy classified with the present invention is greatly improved with respect to the prior art.

TABLE 1 accuracy (%) comparison of fuzzy regions on different threshold

| Threshold | Fuzzy Ratio | Fuzzy Accuracy | Origin Accuracy | Improved |
|---|---|---|---|---|
| 0.05 | 2.21 | 60.3 | 43.5 | 16.8 |
| 0.10 | 4.62 | 62.6 | 52.1 | 10.5 |
| 0.15 | 6.61 | 61.0 | 51.3 | 9.7 |
| 0.20 | 8.94 | 60.1 | 53.1 | 7.0 |
| 0.25 | 11.21 | 61.7 | 54.1 | 7.6 |
| 0.30 | 13.44 | 62.3 | 56.5 | 5.8 |

Table 2 further shows the difference on each class in the evaluation. As can be seen from Table 2, the fuzzy accuracy classified with the present invention for each of the classes sky, green and body is greatly improved with respect to the prior art.

TABLE 2 accuracy (%) comparison of fuzzy regions on each class

| Threshold | sky | | green | | body | | others | |
|---|---|---|---|---|---|---|---|---|
| | fuzzy | original | fuzzy | original | fuzzy | original | fuzzy | original |
| 0.05 | 28.5 | 28.7 | 48.4 | 8.2 | 37.3 | 2.5 | 82.9 | 96.9 |
| 0.10 | 44.7 | 15.6 | 41.6 | 21.4 | 42.4 | 2.7 | 86.4 | 91.9 |
| 0.15 | 41.7 | 12.9 | 43.0 | 28.4 | 42.1 | 1.8 | 82.9 | 87.3 |
| 0.20 | 38.2 | 11.8 | 45.0 | 34.3 | 42.2 | 1.7 | 79.4 | 86.5 |
| 0.25 | 34.1 | 10.3 | 50.2 | 36.5 | 42.3 | 1.6 | 79.1 | 87.3 |
| 0.30 | 33.7 | 10.3 | 52.2 | 40.4 | 44.3 | 1.6 | 77.3 | 88.0 |

As described above, the classification confidence of each extracted fuzzy region is updated independently. Alternatively, the adjacent fuzzy regions can be merged. That is to say, the fuzzy region extraction step 420 may further comprise a fuzzy region merging step for merging the adjacent fuzzy regions. And the adjacent map establishment step 1310 gets the neighbourhood of the obtained merged fuzzy region instead of the neighbourhood of the separate fuzzy region. Also, the weighted confidence calculating step 1320 accumulates the classification confidences of the fuzzy regions in each merged fuzzy region and the adjacent regions of the merged fuzzy region in weighting.

Figure 14:
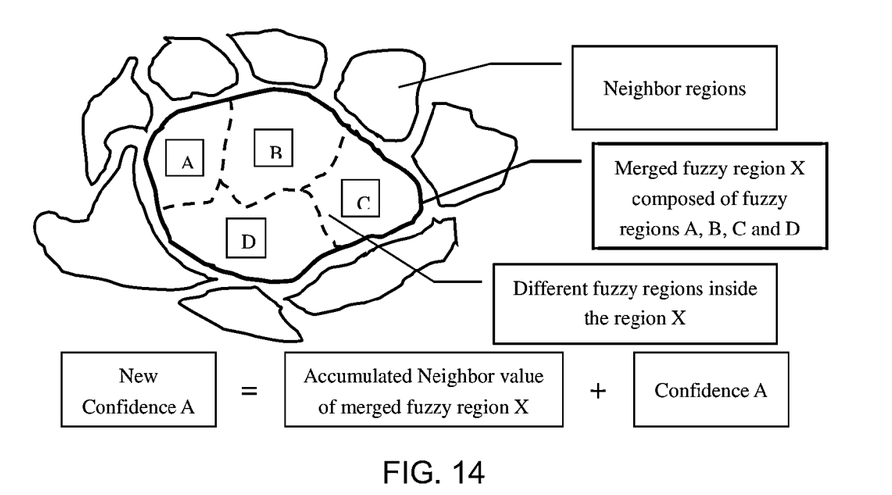
FIG. 14 schematically shows an illustration of the confidence update method based on the merged fuzzy regions according to an embodiment of the present invention.

FIG. 14 schematically shows an illustration of the confidence update method based on the merged fuzzy regions according to an embodiment of the present invention.

As shown in FIG. 14, the fuzzy regions A, B, C and D are merged into a merged fuzzy region X. Each of the fuzzy regions A, B, C and D is calculated with the same group of neighbors, but the confidence thereof is updated based on its own confidence. So it gets different updated results for different fuzzy regions in the same merged fuzzy region after normalization.

For example, the confidences of Green for the fuzzy regions A, B, C and D are 0.31, 0.26, 0.23 and 0.38, respectively; the confidence of Others for the fuzzy regions A, B, C and D are 0.33, 0.22, 0.35 and 0.33, respectively. The confidence update for each class of the fuzzy region is according to the weighted accumulating method. The weighted accumulated values of all neighbors on Green and Others are 0.40 and 0.29, respectively. If Const1=1, Const2=1, the confidence of Green for the fuzzy regions A, B, C and D will be changed to 0.71, 0.66, 0.63 and 0.78, respectively; the confidence of Others for the fuzzy regions A, B, C and D are 0.62, 0.51, 0.64 and 0.62, respectively.

Then, after normalization, the updated confidence of Green for the fuzzy region A is obviously larger than that of Others. Thus, the fuzzy region A can be classified to Green with a higher confidence. Similarly, the fuzzy regions B and D can be classified to Green with a higher confidence. However, the updated confidences of the two classes for the fuzzy region C are still close to each other. That is, the region C will still be considered as fuzzy region due to its non-obvious confidence.

The method based on the merged fuzzy region can also improve the precision of the classification to the image similarly to the separate fuzzy region.

Figure 15:
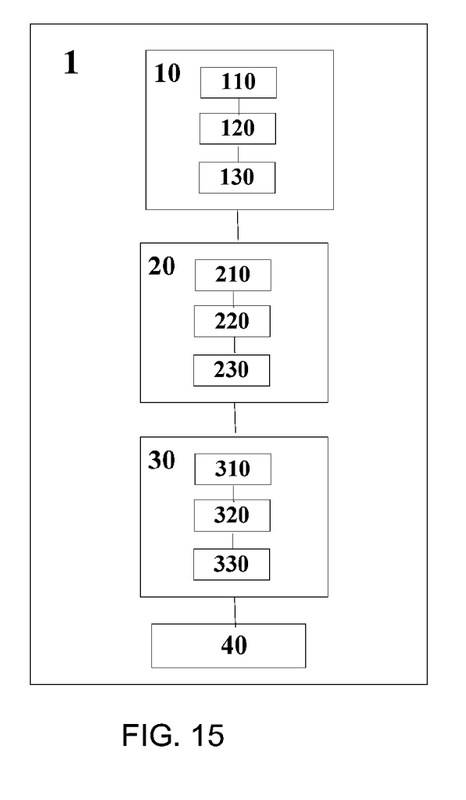
FIG. 15 is a schematic functional block diagram of an image processing apparatus for classifying each region in an image according to an exemplary embodiment of the present invention.

FIG. 15 is a schematic functional block diagram of an image processing apparatus for classifying each region in an image according to an exemplary embodiment of the present invention.

As shown in FIG. 15, the image processing apparatus 1 for classifying each region in an image may comprise a confidence generation means 10, a fuzzy region extraction means 20, a confidence update means 30 and a classification means 40, which are configured to implement the confidence generation step 410, the fuzzy region extraction step 420, the confidence update step 430 and the classification step 440 shown in FIG. 4, respectively.

Preferably, the confidence generation means 10 further comprises a region segmentation unit 110, a feature extraction unit 120 and a confidence calculation unit 130, which are configured to implement the region segmentation step 510, the feature extraction step 520 and the confidence calculation step 530 shown in FIG. 5, respectively.

Preferably, the fuzzy region extraction means 20 further comprises a confidence normalization unit 210, a confidence difference calculation unit 220 and a fuzzy region judgment unit 230, which are configured to implement the confidence normalization step 7210, the confidence difference calculation step 7220 and the fuzzy region judgment step 7230 shown in FIG. 7, respectively.

Alternatively, the fuzzy region extraction means 20 may further comprise a confidence map generation unit 210', a region segmentation unit 220' and a fuzzy region judgment unit 230', which are configured to implement the confidence map generation step 8210, the region segmentation step 8220 and the fuzzy region judgment step 8230 shown in FIG. 8, respectively.

Alternatively, the fuzzy region extraction means 20 may further comprise a fuzzy region merging unit (not shown) configured to merge adjacent fuzzy regions into a merged fuzzy region.

Preferably, the confidence update means 30 further comprises an adjacent map establishment unit 310, a weighted confidence calculating unit 320 and a confidence normalization unit 330, which are configured to implement the adjacent map establishment step 1310, the weighted confidence calculating step 1320 and the confidence normalization step 1330 shown in FIG. 10, respectively.

Up to now, the image processing method and the image processing apparatus for classifying each region in an image according to the present invention have been described schematically. It shall be noted that, all the apparatuses, means, and units described above are exemplary and/or preferable modules for implementing the image processing method and the image processing apparatus of the present invention.

The modules for implementing the various steps are not described exhaustively above. Generally, where there is a step of performing a certain process, there is a corresponding functional module or means or unit for implementing the same process.

It is possible to implement the methods and apparatuses of the present invention in many ways. For example, it is possible to implement the methods and apparatuses of the present invention through software (such as a computer readable program), hardware (such as a processor, an application specific integrated circuit or the like), firmware or any combination thereof. In addition, the above described order of the steps for the methods is only intended to be illustrative, and the steps of the methods of the present invention are not necessarily limited to the above specifically described order unless otherwise specifically stated. Besides, in some embodiments, the present invention can also be embodied as programs recorded in a recording medium, including machine-readable instructions for implementing the methods according to the present invention. Thus, the present invention also covers recording mediums which store the programs for implementing the methods according to the present invention.

Technical solutions by all combinations of steps described above and units corresponding to these steps are included in the disclosure of the present application, as long as the technical solutions they constitute are complete and applicable. On other words, two or more means can be combined as one means as long as their functions can be achieved; on the other hand, any one means can be divided into a plurality of means, as long as similar functions can be achieved. Particularly, the methods and apparatus described with reference to FIGS. 1-15 can be applied alone or in combination with each other to a method and apparatus for classifying each region in an image.

While the present invention has been described with reference to exemplary embodiments, it is to be understood that the present invention is not limited to the disclosed exemplary embodiments. It is apparent to those skilled in the art that the above exemplary embodiments may be modified without departing from the scope and spirit of the present invention. The scope of the following claims is to be accorded the broadest interpretation so as to encompass all such modifications and equivalent structures and functions.

What is claimed is:

1. An image processing method for classifying each of a plurality of regions in an image to one of a plurality of predefined classes using classification confidences, the method comprising:
   a confidence generation step for generating, for each of a plurality of regions of the image, a set of classification confidences, each classification confidence corresponding to one of a plurality of predefined classes and representing the probability of the respective region belonging to the predefined class; and
   a classification step for classifying the regions in the image wherein for each of the regions for which an obvious match with one of the predefined classes exists based on the classification confidences associated with the region, classifying the region to the respective predefined class based on the classification confidences associated with the region,
   the method further comprising:
   a fuzzy region extraction step for extracting and designating as fuzzy regions one or more regions of the plurality of regions, which do not have an obvious match with one of the plurality of predefined classes based on their set of associated classification confidences; and
   a confidence update step for updating the classification confidence for each such fuzzy region based on the sets of classification confidences associated with adjacent regions thereof,
   wherein the classification step further classifies the fuzzy regions to respective predefined classes based on the updated classification confidences.

2. The image processing method according to claim 1, wherein the fuzzy region extraction step and the confidence update step are repeated one or more times.

3. The image processing method according to claim 1, wherein the fuzzy region extraction step comprises:
   a confidence normalization step for normalizing the classification confidences for each region in the image;
   a confidence difference calculation step for calculating the difference between the maximum classification confidence and the second maximum classification confidence for each region; and
   a fuzzy region judgment step for judging a region, for which the calculated confidence difference is lower than a predefined threshold, to be a fuzzy region.

4. The image processing method according to claim 1, wherein the fuzzy region extraction step comprises:
   a confidence map generation step for creating a confidence map for each predefined class based on the classification confidence of each region;
   a region segmentation step for segmenting each confidence map into foreground and background regions of each predefined class based on the confidence maps and predefined thresholds; and
   a fuzzy region judgment step for judging a region, which is not segmented into the foreground region of one and only one predefined class, to be a fuzzy region.

5. The image processing method according to claim 3, wherein
   the fuzzy region extraction step further comprises a fuzzy region merging step for merging the adjacent fuzzy regions.

6. The image processing method according to claim 4, wherein each confidence map is segmented into foreground and background regions of each predefined class based on Graph-cut method in the region segmentation step.

7. The image processing method according to claim 1, wherein the confidence update step comprises:
   an adjacent map establishment step for obtaining information about the neighborhood of each fuzzy region;
   a weighted confidence calculating step for accumulating the classification confidences associated with each fuzzy region and the adjacent regions thereof in weighting; and
   a confidence normalization step for normalizing the accumulated classification confidence of each fuzzy region as the updated classification confidence.

8. The image processing method according to claim 5, wherein the confidence update step comprises:
   an adjacent map establishment step for obtaining information about the neighborhood of each merged fuzzy region obtained in the fuzzy region extraction step;
   a weighted confidence calculating step for accumulating the sets of classification confidences associated with the fuzzy regions in each merged fuzzy region and the adjacent regions of the merged fuzzy region in weighting; and
   a confidence normalization step for normalizing the accumulated classification confidence of each fuzzy region as the updated classification confidence.

9. The image processing method according to claim 1, wherein the confidence generation step comprises:
   a region segmentation step for segmenting the image into a plurality of non-overlapped regions;
   a feature extraction step for extracting the features for each region; and
   a confidence calculation step for calculating the classification confidence for each region based on a trained model for each predetermined class.

10. The image processing method according to claim 1, wherein the obtained classifications of the regions of the image are used to perform an image composition or an image search.

11. An image processing apparatus for classifying each of a plurality of regions in an image to one of a plurality of predefined classes using classification confidences, the apparatus comprising:
    a confidence generation means for generating, for each of a plurality of regions of the image, a set of classification confidences, each classification confidence corresponding to one of a plurality of predefined classes and representing the probability of the respective region belonging to the predefined class; and
    a classification means for classifying the regions in the image, wherein for each of the regions of the image for which an obvious match with one of the predefined classes exists based on the classification confidences associated with the region, classifying the region to the respective predefined class based on the classification confidences associated with the region,
    the image processing apparatus further comprising:
    a fuzzy region extraction means for extracting and designating as fuzzy regions one or more regions of the plurality of regions, which do not have an obvious match with one of the plurality of predefined classes based on their set of associated classification confidences; and
    a confidence update means for updating the classification confidence for each such fuzzy region based on the sets of classification confidences associated with adjacent regions thereof, wherein the classification means further classifies the fuzzy regions to respective predefined classes based on the updated classification confidences.

12. The image processing apparatus according to claim 11, wherein the fuzzy region extraction means comprises:
a confidence normalization unit for normalizing the classification confidences for each region in the image;
a confidence difference calculation unit for calculating the difference between the maximum classification confidence and the second maximum classification confidence for each region; and
a fuzzy region judgment unit for judging a region, for which the calculated confidence difference is lower than a predefined threshold, as a fuzzy region.

13. The image processing apparatus according to claim 11, wherein the fuzzy region extraction means comprises:
a confidence map generation unit for creating a confidence map for each predefined class based on the classification confidence of each region;
a region segmentation unit for segmenting each confidence map into foreground and background regions of each predefined class based on the confidence maps and predefined thresholds; and
a fuzzy region judgment unit for judging region, which is not segmented into the foreground region of one and only one predefined class, to be a fuzzy region.

14. The image processing apparatus according to claim 12, wherein
the fuzzy region extraction means further comprises a fuzzy region merging unit for merging the adjacent fuzzy regions.

15. The image processing apparatus according to claim 11, wherein the confidence update means comprises:
an adjacent map establishment unit for obtaining information about the neighborhood of each fuzzy region;
a weighted confidence calculating unit for accumulating the classification confidences associated with each fuzzy region and the adjacent regions thereof in weighting; and
a confidence normalization unit for normalizing the accumulated classification confidence of each fuzzy region as the updated classification confidence.

16. The image processing apparatus according to claim 14, wherein the confidence update means comprises:
an adjacent map establishment unit for obtaining information about the neighborhood of each merged fuzzy region obtained in the fuzzy region extraction means;
a weighted confidence calculating unit for accumulating the sets of classification confidences associated with the fuzzy regions in each merged fuzzy region and the adjacent regions of the merged fuzzy region in weighting; and
a confidence normalization unit for normalizing the accumulated classification confidence of each merged fuzzy region as the updated classification confidence.

17. The image processing apparatus according to claim 11, wherein the confidence generation means comprises:
a region segmentation unit for segmenting the image into a plurality of non-overlapped regions;
a feature extraction unit for extracting the features for each region; and
a confidence calculation unit for calculating the classification confidence for each region based on a trained model for each predetermined class.

18. The image processing apparatus according to claim 11, wherein the obtained classifications of the regions of the image are used to perform an image composition or an image search.

* * * * *